Feb. 8, 1955  J. W. SHIPP  2,701,667
COW FEEDER
Filed March 29, 1952
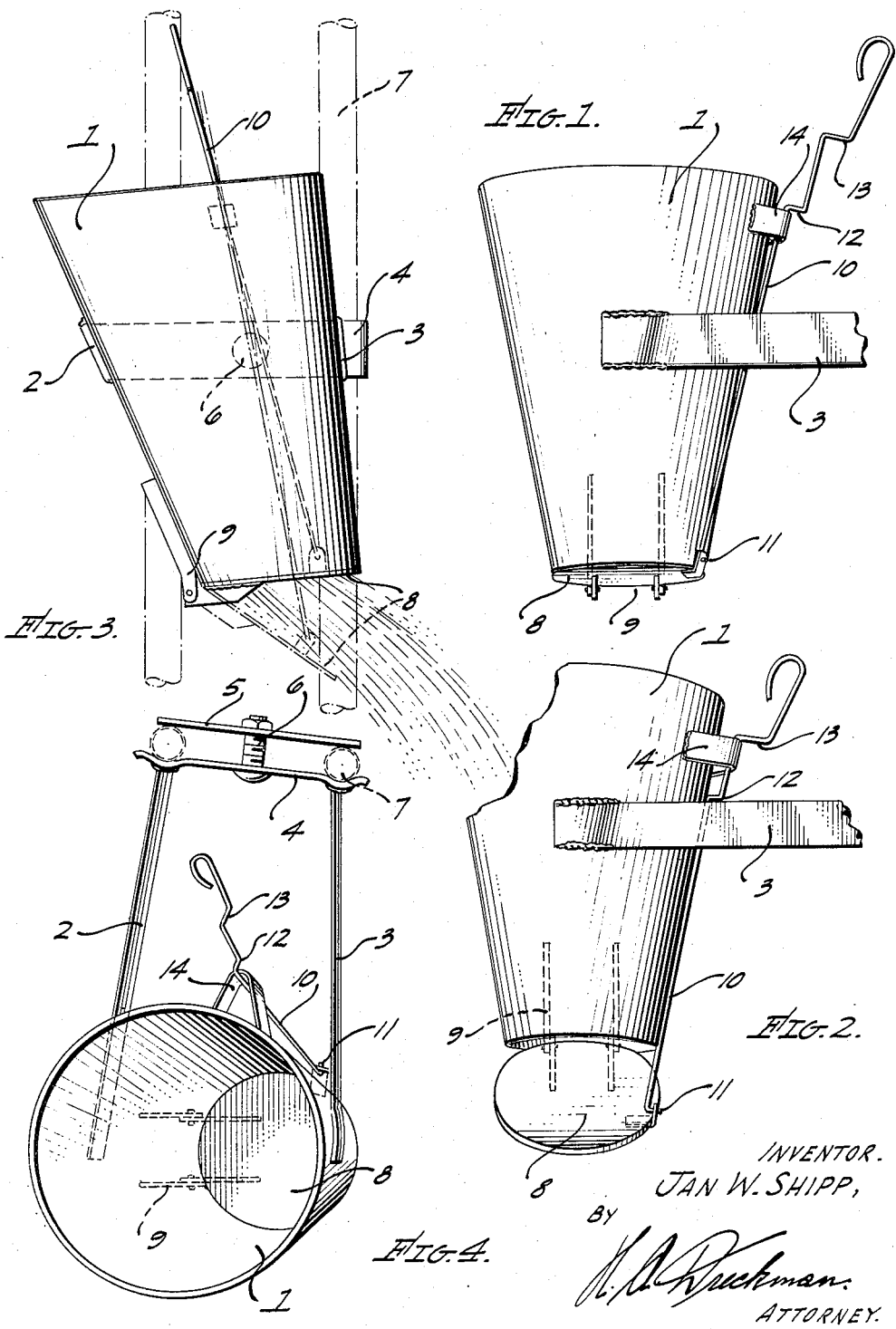
INVENTOR.
JAN W. SHIPP,
BY
ATTORNEY.

United States Patent Office 2,701,667
Patented Feb. 8, 1955

2,701,667

COW FEEDER

Jan W. Shipp, Long Beach, Calif.

Application March 29, 1952, Serial No. 279,318

3 Claims. (Cl. 222—556)

This invention relates to a cow feeder for use in milking stalls and where it is desired to distribute a dry feed to the cow at the time she is being milked. Feeders are attached to the stanchions and must be so positioned to one side of the head of the cow so that the cow cannot butt the feeder and thus destroy or mutilate it.

An object of my invention is to provide a cow feeder which is adapted to be mounted on stanchions and in such a position that the cow cannot butt the feeder as she moves her head either vertically or from side to side.

Another object of my invention is to provide a novel cow feeder which, while it is positioned to one side of the head of the cow, will still distribute the feed immediately in front of the cow so that she can readily reach it.

Still another object of my invention is to provide a novel cow feeder which can be easily opened or closed, and also which is simple in construction and inexpensive to manufacture.

Other objects, advantages and features of invention may appear from the accompanying drawing, the subjoined detailed description and the appended claims.

In the drawing:

Figure 1 is a side elevation of my cow feeder, showing the gate in closed position.

Figure 2 is a view similar to Figure 1, but showing the gate in open position.

Figure 3 is a front elevation of my cow feeder.

Figure 4 is a top plan view of the same.

Referring more particularly to the drawing, when cows are to be milked they are run into appropriate stalls and these stalls are provided with stanchions at the front end, through which the cow places her head. The feeders are mounted on the stanchions and in such a position that the cow cannot butt the feeders while she is being milked. All of this will be subsequently described.

The feeder consists of a pail or container 1, which is preferably frustro-conical in shape. A pair of arms 2—3 are fixedly secured to the container 1, that is, to the sides thereof, and the arms are preferably attached to opposite sides of the container. The arms 2—3 project horizontally and rearwardly from the container, and a mount bar or clamp 4 is fixedly secured to the rear of the arms 2—3. A second bar or clamp 5 is connected to the bar 4 by means of a bolt 6. Thus, the two clamps 4 and 5 are pressed tightly against the spaced stanchions 7.

It will be noted from Figure 3 that the container 1 is tipped or inclined somewhat towards one side, that is towards the head of the cow which is to be fed from the feeder. A gate 8, circular in shape, is mounted on the bottom of the container 1 by means of the hinge 9, as best shown in Figure 3. The gate 8, in open position, is inclined, as shown in Figure 3, thus directing the dry feed to one side and at an angle to the container 1. The gate 8 is held in either closed or open position by means of the rod 10, which is pivotally attached to the gate 8, as shown at 11.

The rod 10 is provided with two spaced stops 12 and 13, adjacent the upper end thereof, and these stops engage a loop or strap 14 which is secured to the container 1. The loop 14 is sufficiently large to permit the rod 10 to be tilted inwardly or outwardly relative to the container 1 thus enabling the user to engage the stops 12 or 13, with the loop, as may be desired.

The lower stop 12, when engaging the loop 14, will hold the gate 8 in closed position. When the stop 13 engages the loop 14 the gate 8 will be held open and in a proper inclined position so that the feed will be thrown to one side and immediately in front of the cow. With this arrangement, it is possible to position the container 1 a sufficient distance to one side of the cow so that she cannot butt the feeder as her head is moved and still the feed is distributed immediately in front of the cow when the gate 8 is open. The rod 10 is manually operated, as will be evident and the milker determines when the feed is to be distributed and the feeder open.

Having described my invention, I claim:

1. A cow feeder comprising a container open at the top and the bottom, a gate pivotally mounted on the container and closing the bottom of said container said gate being pivoted on one side of the container and the gate extending at a downward angle across the bottom of the container in the open position of the gate, a rod secured at one end to said gate, vertically spaced stop shoulders on said rod, and a loop mounted on the container, said rod extending through said loop, and said stop shoulders engaging said loop to hold the gate in open and closed position.

2. A cow feeder comprising a container open at the top and the bottom, a gate pivotally mounted on the container and closing the bottom of said container said gate being pivoted on one side of the container, a rod secured at one end to said gate, vertically spaced stop shoulders on said rod, and a loop mounted on the container, said rod extending through said loop, and said stop shoulders engaging said loop to hold the gate in open and closed position, said container being frustroconical in shape, and said gate in the open position thereof being positioned at an angle to the vertical center line of the container.

3. A cow feeder comprising a container open at both the top and the bottom, a gate pivotally mounted to the lower end of said container and adapted to close the bottom of the container in one position thereof said gate being pivoted on one side of the container, a rod pivotally attached to the gate at the lower end of the rod, vertically spaced stop shoulders on the rod, a loop projecting from the container, said rod extending through the loop and said stop shoulders selectively engaging the loop to hold said gate in open and closed position, one of said stop shoulders holding the gate in an opened position, said gate being inclined to the vertical center line of the container in the open position of the gate to direct the feed laterally from said container.

References Cited in the file of this patent

UNITED STATES PATENTS

| 883,796 | Flippen | Apr. 7, 1908 |
| 1,076,193 | Daminaitis | Oct. 21, 1913 |
| 1,107,088 | Meier | Aug. 11, 1914 |
| 1,732,271 | Krumm | Oct. 22, 1929 |
| 2,081,947 | McCornack | June 1, 1937 |

FOREIGN PATENTS

| 710,276 | France | Aug. 20, 1931 |